United States Patent
Keats et al.

[11] 3,785,275
[45] Jan. 15, 1974

[54] BARBECUE COOKER

[75] Inventors: Richard L. Keats, Sands Point, Port Wash., N.Y.; Harold Glaser; Charles Leach, both of St. Louis County, Mo.

[73] Assignee: Glaser Products Corporation, Neosho, Mo.

[22] Filed: July 26, 1971

[21] Appl. No.: 166,004

[52] U.S. Cl. ............ 99/446, 99/450, 126/25
[51] Int. Cl. ............................... A47j 37/07
[58] Field of Search ............... 99/446, 259, 339, 99/340, 375, 400, 425, 443 R, 447, 448, 449, 99/450; 126/41, 25

[56] References Cited
UNITED STATES PATENTS

| | | | |
|---|---|---|---|
| 3,279,452 | 10/1966 | Hottenroth et al. | 126/25 R |
| 3,301,172 | 1/1967 | Haro | 99/446 |
| 3,330,266 | 7/1967 | Stephen | 126/25 R |
| 3,474,725 | 10/1969 | McClaren | 99/446 X |
| 3,667,449 | 6/1972 | Persinger et al. | 126/25 R X |
| 4,652 | 11/1871 | Roe | 99/450 |
| 3,244,163 | 4/1966 | McGlaughlin | 126/41 X |
| 3,386,432 | 6/1968 | Hanson | 126/41 |
| 3,524,980 | 8/1970 | Meloan | 126/41 X |
| 3,590,726 | 7/1971 | Warner | 99/339 |
| 3,593,647 | 7/1971 | Copeland | 99/259 |
| 3,611,915 | 10/1971 | Glasser et al. | 99/446 X |
| 3,657,996 | 4/1972 | Thompson | 99/443 R |

Primary Examiner—Harvey C. Hornsby
Assistant Examiner—Arthur O. Henderson
Attorney—Ralph W. Kalish

[57] ABSTRACT

A barbecue cooker, which may be adapted for gas operation, comprising a fire bowl, a gas burner provided in the lower portion of said fire bowl, there being an opening in the base of said fire bowl through which extends means for connecting said burner to a suitable source of gas. A grill is supported above said burner and constructed for inclination upwardly from its outer edges toward its center. An annular rib surrounds the fire bowl opening and an aperture is located proximate said rib on the side thereof opposite said opening for communication with a receptacle mounted on said cooker downwardly of said aperture.

6 Claims, 8 Drawing Figures

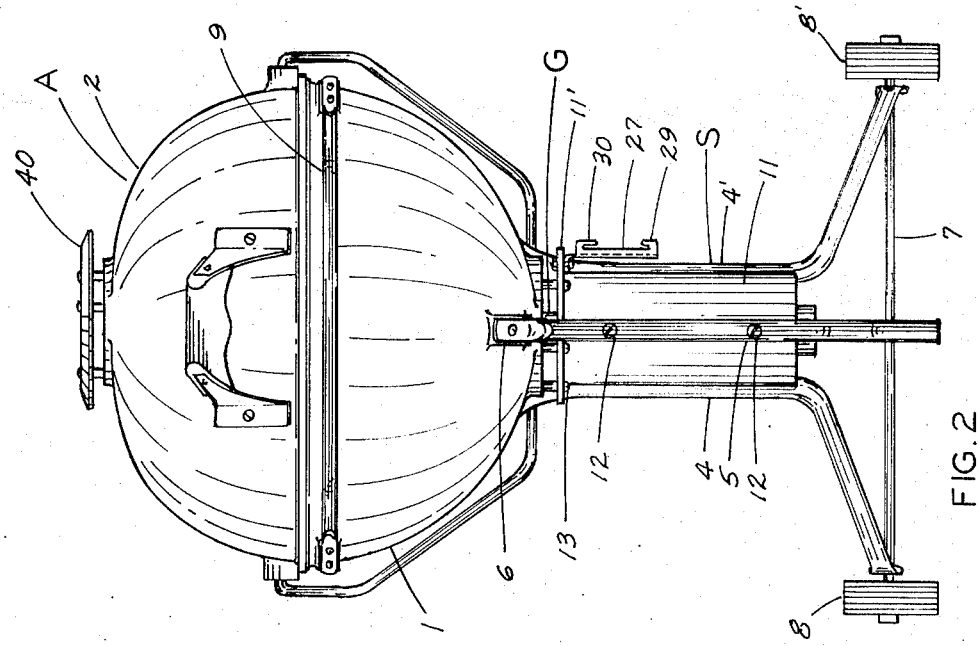
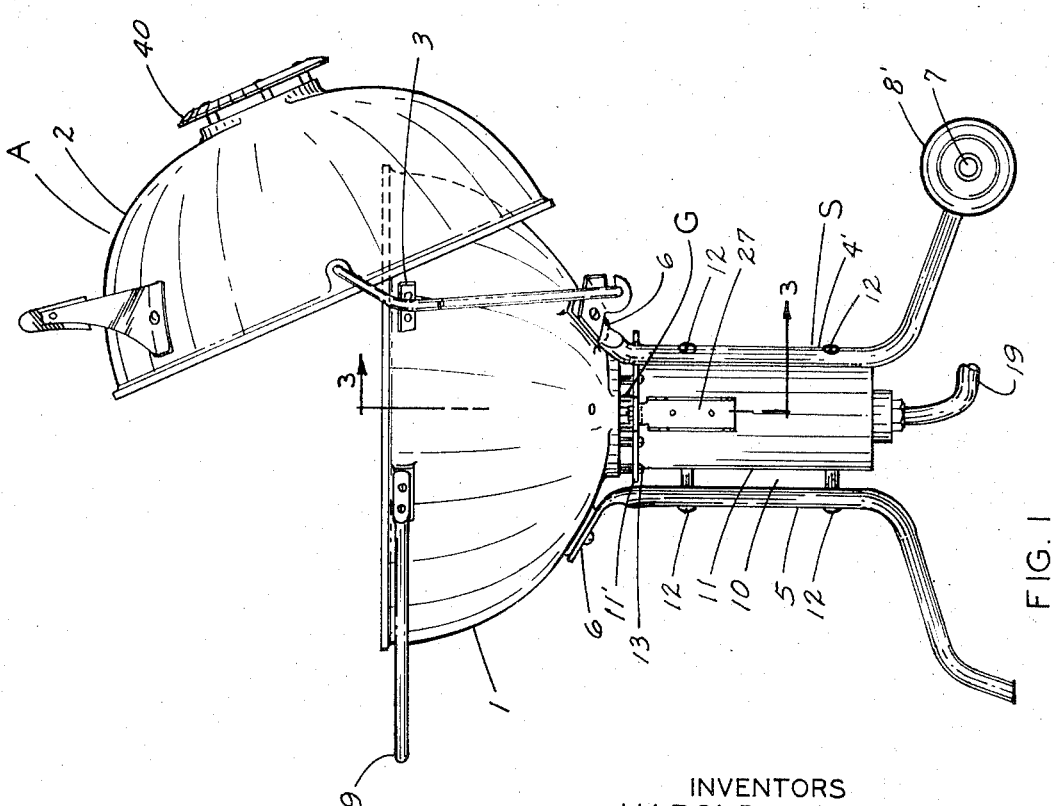
INVENTORS
HAROLD GLASER
RICHARD L. KEATS
CHARLES LEACH
ATTORNEY

INVENTORS
HAROLD GLASER
RICHARD L. KEATS
CHARLES LEACH

BY Ralph N. Kalish

ATTORNEY

INVENTORS
HAROLD GLASER
RICHARD L. KEATS
CHARLES LEACH

BY

ATTORNEY

BARBECUE COOKER

BACKGROUND AND SUMMARY OF THE INVENTION

This invention relates in general to barbecue cookers, and more particularly, to cookers adapted for directing the juices or drippings from food being cooked to a receptacle to prevent contact thereof with the heat source.

It is an object of the present invention to provide a barbecue cooker having means for conducting cooking drippings along a course following the grill and the inner face of the fire bowl to obviate contact with a heat supply, such as a gas burner.

It is another object of the present invention to provide a barbecue cooker of the type stated having means for emitting food drippings exteriorally of the cooker for collection within a conveniently located, removable receptacle.

It is a further object of the present invention to provide a barbecue cooker of the type stated which incorporates a food-receiving grill having upwardly slanted, converging elements so that the center thereof is elevated with respect to its periphery for leading cooking juices or drippings toward such periphery and thence along the inner face of the wall of the fire bowl.

It is another object of the present invention to provide a barbecue cooker of the type stated which is especially adapted for gas operation.

It is a still further object of the present invention to provide a barbecue cooker which may be of the kettle type; which is most economically manufactured; which presents a simplicity of parts, being resistant to breakdown; and which is durable and reliable in usage.

BRIEF DESCRIPTION OF THE DRAWINGS

FIG. 1 is a side elevational view of a barbecue cooker of the kettle type, showing the hood in open condition, and being constructed in accordance with and embodying the present invention.

FIG. 2 is a front view of the cooker with the hood in closed condition.

DESCRIPTION OF THE PREFERRED EMBODIMENT

Figure 3:
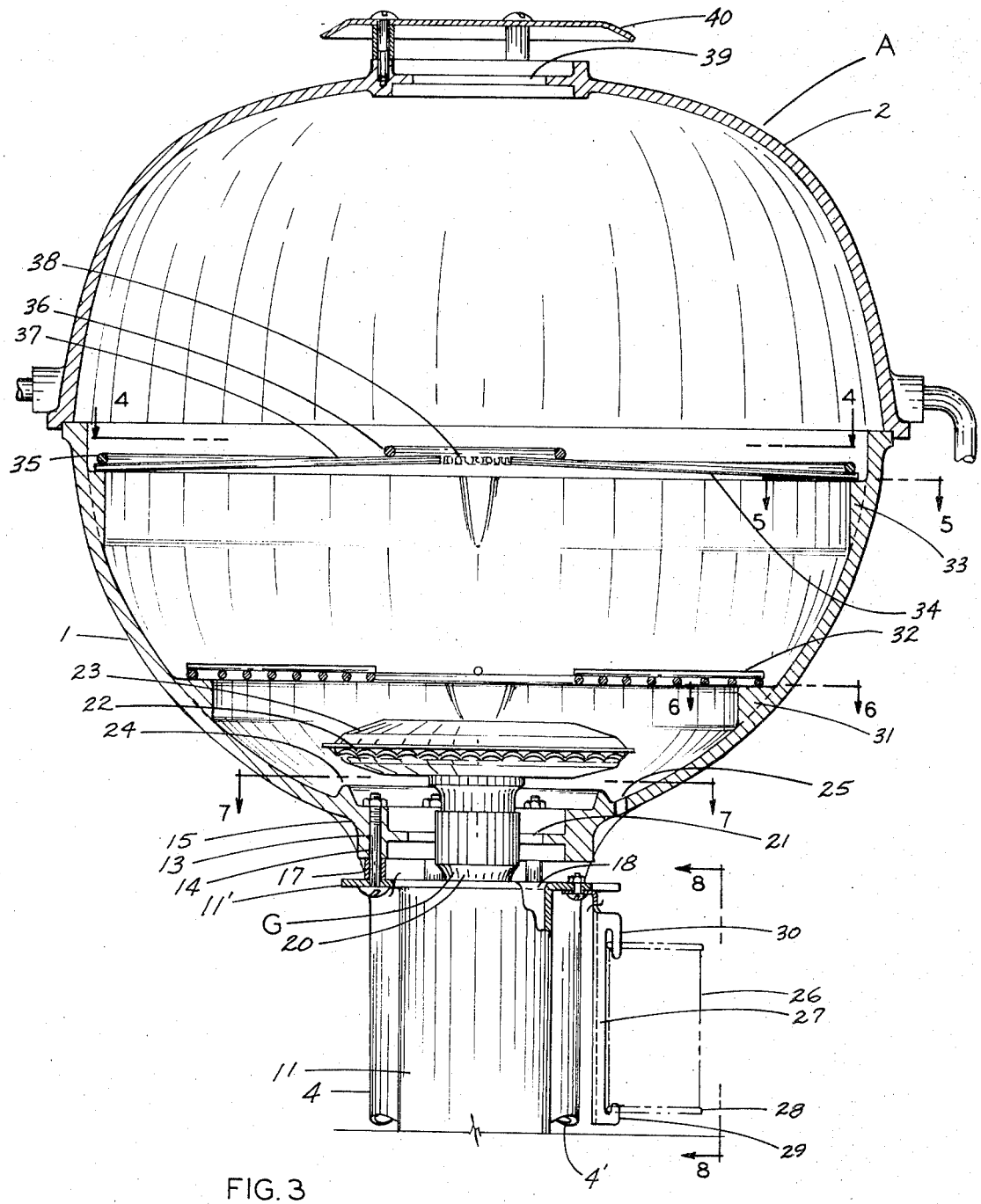
FIG. 3 is a vertical transverse sectional view taken on the line 3—3 of FIG. 1.
Figure 4:
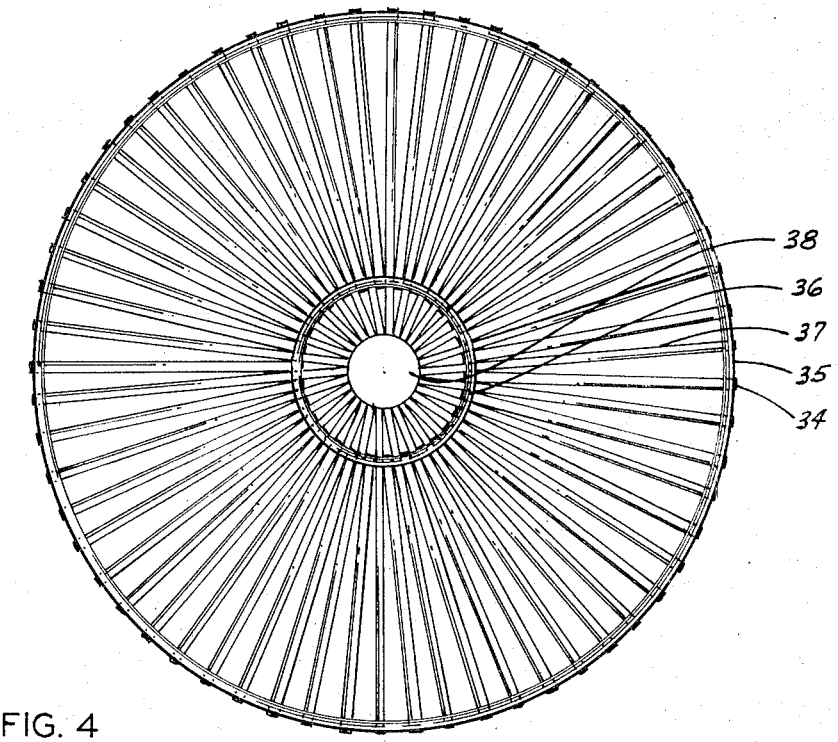
FIG. 4 is a top plan view of the grill taken on the line 4—4 of FIG. 2.
Figure 7:
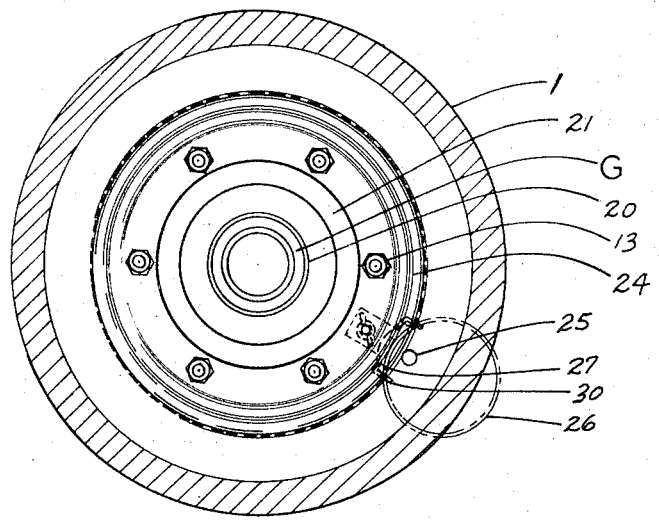
FIG. 7 is a horizontal transverse sectional view taken on the line 7—7 of FIG. 3.

Referring now by reference characters to the drawings, A generally designates a barbecue cooker, which is shown as of the kettle type, comprising a substantially hemispherical fire bowl 1 and a similarly shaped dome, hood, or hemispherical closure 2; such cooker being of the type set forth in copending application, Ser. No. 869,093 filed Sept. 24, 1969, now U.S. Pat. No. 3,611,915, upon a Barbecue Cooker. It will be apparent that the present invention is useful as well with cookers of other types but is illustrated in conjunction with the kettle type for purposes of exposition.

As is well-known, hood 2 is hingedly engaged upon bowl 1, as by means broadly indicated at 3, whereby said hood 2 may be rocked between cooker-closed condition with the same coveringly disposed upon bowl 1 (FIG. 2) and cooker-open condition wherein said hood is rearwardly swung to allow facile access to the cooker interior (FIG. 1). The particular hinge means do not form a part of the present invention. As presented in the drawings, cooker A may be mounted upon a tripodal support designated S, comprising legs 4,4' and 5 which at their upper ends are suitably, secured as at 6, by bolts and the like to the under portion of fire bowl 1, and which at their lower end portions may be turned outwardly to provide a suitable base. The lower end extremities of legs 4,4' are flattened (not shown) and provided with registering apertures (not shown) for extension therethrough of an axle 7 which carries wheels 8,8' on its projecting ends for rendering cooker A mobile; there being a push bar or handle 9 fixed as by brackets upon the normally forward upper portion of fire bowl 1 for directing purposes.

Legs 4,4' and 5 immediately downwardly of fire bowl 1 are sufficiently mutually spaced apart to develop a volume 10 within which is disposed the cylindrical housing 11 of a gas burner unit, indicated generally G; said housing 11 being secured as by bolts 12 to said legs 4,4',5. At its upper end housing 11 is provided with a peripheral flange 11' through openings in which upwardly extended bolts 13 project into aligned bores 14 provided in an annular boss 15 formed in the lower central portion of fire bowl 1; the upper extremities of said bolts 13 being secured as by nuts 16. Surrounding bolts 13 between flange 11' and boss 15 is a collar or spacer 17 for maintaining housing 11 spacedly below fire bowl 1 for developing an air intake 18.

Gas unit G is of general, conventional character with housing 11 being connected at its lower end to one end of a gas feeder tube 19 which is engaged at its opposite end to a convenient source of LP or natural gas. Unit G comprehends, within housing 11, a gas control valve (not shown) with an adjustment shaft (not shown) extending outwardly through housing 11 and carrying a knob at its extremity for ease of manipulation; said valve being connected within a pipe 20 which progresses upwardly within housing 11 for extension above the upper end thereof and into fire bowl 1 via a relatively enlarged opening 21 formed within the base of said fire bowl 1 and surrounded by boss 15 (FIG. 3). Said pipe is provided with suitable openings and controls for effecting the desired air-gas intermixture within a mixing chamber (not shown), said air-gas mixture is directed upwardly of pipe 20 for emission through the circumferentially spaced apart ports 22 of a generally annular shaped gas manifold or burner 23; which latter has a diameter greater than that of opening 21 so that the same overlies the portion of fire bowl 1 surrounding said opening 21 (FIG. 3). Thus, the air-gas mixture is emitted for combustion to provide a well dispersed source of heat.

Figure 8:
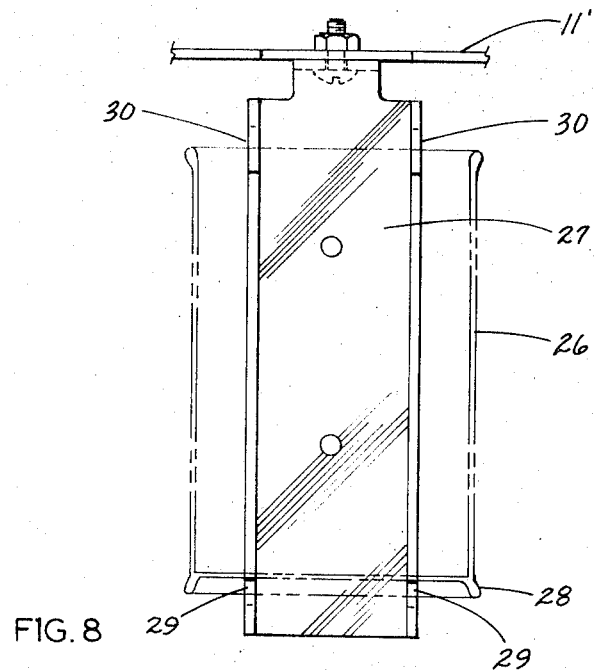
FIG. 8 is an elevational view of the receptacle bracket taken on the line 8—8 of FIG. 3.
Figure 5:
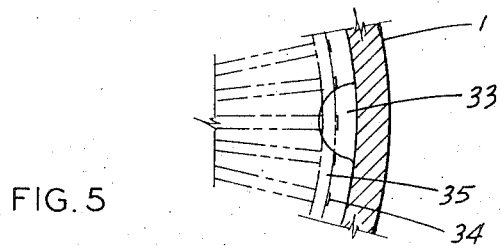
FIG. 5 is a horizontal transverse sectional view taken on the line 5—5 of FIG. 3.
Figure 6:
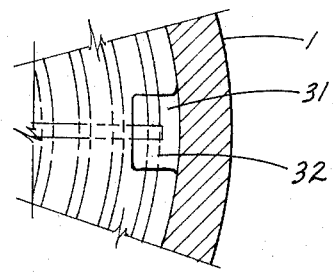
FIG. 6 is a horizontal transverse sectional view taken on the line 6—6 of FIG. 3.

For purposes to be described hereinbelow, there is provided an annular ridge or detent 24 on the inner face of fire bowl 1 substantially immediately surrounding opening 21. In immediate adjacency to said ridge 24 but on the side thereof opposite opening 21 is a relatively small orifice 25 which opens at its lower end through the underface of fire bowl 1, in vertically aligned relationship to an open-topped receptacle, as indicated at 26, removably disposed upon a mounting bracket 27 suitably suspended from the adjacent portion of housing flange 11'. Said receptacle 26 is provided on its lower end with a customary endwise rim 28 for engagement on a pair of upstanding lugs 29 formed at the lower end of bracket 27 (FIGS. 3 and 8). Presented on the upper end of mounting bracket 27 for downward extension in respective aligned relationship to lugs 29 are relatively long fingers 30 which in usage will engage the upper edge of receptacle 26 for holding same in operative position. By reason of the differential in lengths of lugs 29 and finger 30 receptacle 26 may be easily removed by causing same to move relatively upwardly on fingers 30 until its bottom margin has cleared lugs 29. A reverse action is utilized for mounting a receptacle 26 upon said bracket 27.

Formed preferably integrally with fire bowl 1 and provided spacedly about the inner face thereof, slightly upwardly of manifold 23, is a plurality of bosses or shoulders 31 for supporting a fuel grid 32 constructed of rod stock suitably welded into the desired open work arrangement. In usage the particular fuel, such as, especially, charcoal, will be disposed upon grid 32 overlying of gas manifold or burner 23 as described.

Also formed integrally with the inner face of fire bowl 1 proximate the upper edge thereof is another series of relatively shallow bosses or shoulders 33 for supporting peripheral portions of grill 34, which latter is desirably formed of suitable rod stock and comprises an outer ring or annulus 35 having an outside diameter slightly less than the inside diameter of the proximate portion of fire bowl 1, and an inner, concentric diametrally relatively reduced, ring or annulus 36. Rings 35 and 36 are interconnected throughout their circumferential extent by a multiplicity of radially extending rods 37 affixed to said rings, as by welding. The outer end faces of rods 37 are substantially flush with the outermost portion of ring 35 (FIG. 8) but in view of their center-directed convergence are alternately cut off in their inner end portions so that every other rod projects radially inwardly of inner ring 36 for termination spacedly from the center thereof whereby the inner end margins of such rods define a central opening 38.

With reference being made to FIG. 3 it will be seen that inner ring 36 is presented slightly upwardly of outer ring 35 with their respective planes being parallel by reason or rods 37 being inwardly and upwardly inclined toward their inner ends. Accordingly, grill 34 slopes downwardly toward its periphery from its relatively elevated center thereby conducting to the gravitational flow of juices, drippings, and the like emanating from the supported cooking food such as meat, toward outer ring 35 for travel therebeyond and thence descendingly along the inner face of the side wall of fire bowl 1 between bosses 33 and 31. By such construction the cooking juices, drippings, etc., will not drop through central opening 38 which overlies manifold 23 so that the latter is properly protected. By this unique arrangement fuel disposed upon grid 32 is also protected from such drippings, thereby substantially eliminating the customary flashing resulting from such contact.

Provided in the upper central portion of hood 2 is a vent opening 39 provided with an adjustable damper device 40 for appropriate control of exhaust flow.

In view of the foregoing, it will thus be seen that during operation of cooker A, with the particular fuel such as charcoal being requisitely heated by gas burner unit G, the cooking of food disposed upon grill 34 will cause the released juices, drippings, etc., to flow downwardly toward the lower periphery of grill 34 because of its cant so that such hot liquid material will then descend along the inner face of the fire bowl side wall, being thereby directed away from the flame generated by gas burner G as well as from the heated fuel. This flow will be obstructed by ridge 24 so that accidental discharge into, and through, opening 21 is effectively inhibited. The juices accumulating in the base of fire bowl 1 by the detaining character of ridge 24 will ultimately issue from fire bowl 1 through orifice 25 for collection within receptacle 26. Thus, a receptacle 26 is filled the same may be easily removed and replaced by an empty one.

By reason of the novel construction of the components of cooker A, gas burner G is fully guarded from subjection to the normally fatty drippings from the meat being cooked so that no untoward flashing or flaring occurs with attendant potential damage. The flow path established by the coaction of grill 34, inner face of the side wall of fire bowl 1, ridge 24, and orifice 25, causes cooker A to be maintained in a relatively clean state as accumulations and deposits of drippings are relatively materially reduced.

The present invention markedly adapts cooker A for gas firing of the particular fuel thereby obviating the heretofore customary resort to use of lighter fluids and similar readily combustible "starters" so that heating of the fuel may be accomplished without continuing attention by the user by resort to LP or natural gas. It is, of course, evident that the directing path for discharge of drippings as created by the novel coaction of elements of the present invention may be incorporated in cookers other than the kettle type as herein illustrated.

Having described our invention, what we claim and desire to obtain by Letters Patent is:

1. A barbecue cooker comprising means defining an upwardly opening firebowl having a side wall, a food supporting grill provided within said firebowl, said firebowl having an opening in its lower central portion, means supporting said grill in upwardly spaced relationship to the opening in said firebowl, a source of heat provided in said firebowl opening, said grill having a central opening axially aligned with said firebowl opening, said grill having its portions adjacent its central opening inclined downwardly and outwardly away from said opening for gravitationally directing cooking drippings toward the outer portion of said grill for descent along said firebowl side wall, an upstanding ridge encircling said firebowl opening within said firebowl for preventing cooking drippings flowing downwardly along said firebowl side wall from entering said firebowl opening.

2. A barbecue cooker as defined in claim 1 and further characterized by said firebowl having an orifice adjacent said firebowl opening but on the opposite side of said ridge, said orifice opening through said firebowl wall for discharge therethrough of cooking drippings and means exteriorly of said firebowl for receiving drippings discharged through said orifice.

3. A barbecue cooker as defined in claim 2 and further characterized by said means exterior of said firebowl for receiving said drippings comprising a receptacle, bracket means located downwardly of said firebowl for detachably supporting said receptacle in drippings-receiving position.

4. A barbecue cooker as defined in claim 1 and further characterized by said source of heat comprising a manifold for discharge of combustible air-gas mixture, said manifold being presented upwardly of said firebowl opening, a source of gas exterior of said firebowl, means extending through said firebowl opening connecting said manifold and said source of gas.

5. A barbecue cooker as defined in claim 4 and further characterized by a fuel-supporting grid, means for mounting said grid within said firebowl above said manifold and below said grill.

6. A barbecue cooker comprising means defining an upwardly opening firebowl having a side wall, a food supporting grill provided within said firebowl, said grill having a central or inner portion and an outer portion, said firebowl having an opening in its lower central portion, means supporting said grill in upwardly spaced relationship to the opening in said firebowl, said grill being inclined downwardly and outwardly away from its central portion for gravitationally directing cooking drippings toward its outer portion for descent along said firebowl side wall, an upstanding ridge encircling said firebowl opening within said firebowl for preventing cooking drippings flowing downwardly along said firebowl side wall from entering said firebowl opening.

* * * * *